US006229636B1

(12) United States Patent
Sheng

(10) Patent No.: US 6,229,636 B1
(45) Date of Patent: May 8, 2001

(54) ELASTIC SUPPORT FOR THE LIGHT SOURCE OF A SCANNER

(75) Inventor: Thomas Sheng, Hsinchu (TW)

(73) Assignee: Avision Inc., Hsinchu (TW)

( * ) Notice: Subject to any disclaimer, the term of this patent is extended or adjusted under 35 U.S.C. 154(b) by 0 days.

(21) Appl. No.: 09/613,099

(22) Filed: Jul. 10, 2000

(30) Foreign Application Priority Data

Sep. 2, 1999 (TW) ................................................ 88115263

(51) Int. Cl.$^7$ .................................................... G02B 26/08
(52) U.S. Cl. .............................. 359/196; 355/67; 399/221
(58) Field of Search .................................. 359/196, 212; 355/67; 399/220, 221; 362/97, 98; 358/474, 475, 494, 497

(56) References Cited

U.S. PATENT DOCUMENTS 5,712,718 * 1/1998 Chen ..................................... 359/201

* cited by examiner

*Primary Examiner*—James Phan
(74) *Attorney, Agent, or Firm*—H. C. Lin

(57) ABSTRACT

In the scanning optical module of a scanner, the light source module is mounted over the lens module through a spring to push the light source module against the scan window. Thus, the light source is moved closer to the document to be scanned and irradiates the document with higher intensity than prior art light source, which must be clear away from the scan window to allow for manufacturing tolerances.

16 Claims, 7 Drawing Sheets

ELASTIC SUPPORT FOR THE LIGHT SOURCE OF A SCANNER

BACKGROUND OF THE INVENTION (1) Field of the Invention

This invention relates to a scanner, in particular to the light source of the scanner.

(2) Description of the Related Art

In the optical system of a scanner, the light source module can be subdivided into a "light source module" and a "lens module". The light source module refers to the light source components including the light source and the base for supporting the light source. The lens module is to process the light ray with imaging signal including reflecting mirrors and focusing lens, etc. Conventional light source module and lens module are fixed with respect with each other.

FIG. 1 shows the top view of a typical optical module. The light 16 is mounted on an L-shaped base 12 by means of two bracelets 18 as shown in FIG. 2, which is the side view of FIG. 1. The L-shaped base 12 is mounted over the lens module 10. The light source scans and irradiates document 50 placed over a scan window 20 and produces a reflected light ray to pass through the light slot 14 on the lens module 10. As shown in FIG. 2, the reflected light ray 22 through the light slot 14 contains image signal and is reflected by the mirror 102 for further signal processing.

The L-shaped base 12 has a vertical flange. While the flange can reinforce the base to prevent bending and concentrate the light intensity to prevent scattering, the vertical flange protrudes upward toward the scan window 20 typically to an elevation higher than the brackets 18 as shown in FIG. 2. Due to manufacturing variations, allowance must be made to tolerate the any variations in the dimensions of the different components in the light source module and the lens module. In a practical design, the highest point in the light source module must clear the bottom of the window 20 by 3 mm. Otherwise, when the optical module scans the document back and forth, the top of the L-shaped base 12 may scratch the bottom of the scan window and the optical module may even be blocked. As shown in FIG. 2, the distance 66 is the minimum distance of 3 mm allowed for variations in mechanical dimensions of the different components. In practical scanners, the 3 mm allowance is barely enough to prevent scratching.

Such an allowance is not desirable, because the light source 16 must be moved away from the scanned document and is weakened as it irradiates the document.

SUMMARY OF THE INVENTION

An object of this invention is to irradiate the scanned document with a more intense light. Another object of this invention is to move the light source closer to the document being scanned. Still another object of the present invention is to provide smoother scanning motion for the optical module.

These objects are achieved by mounting the light source module over the lens module through a spring. The spring pushes the light source module against scan window with minimum clearance. Thus, the light source is moved closer to the document being scanned and the intensity is increased.

DETAILED DESCRIPTION OF THE INVENTION

Figure 1:
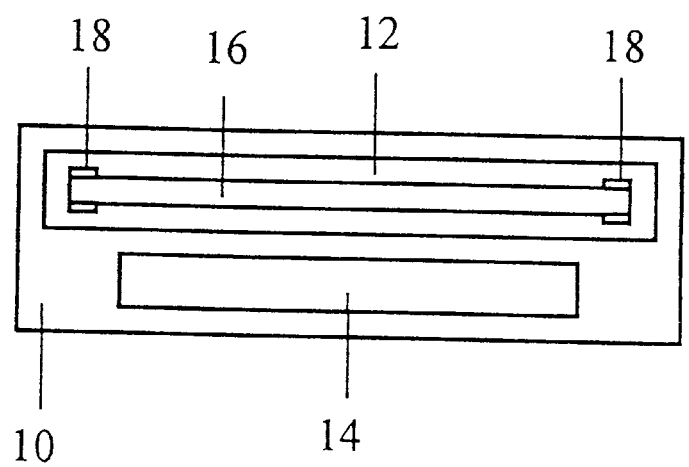
FIG. 1 shows the top view of a prior art light source module.
Figure 3:
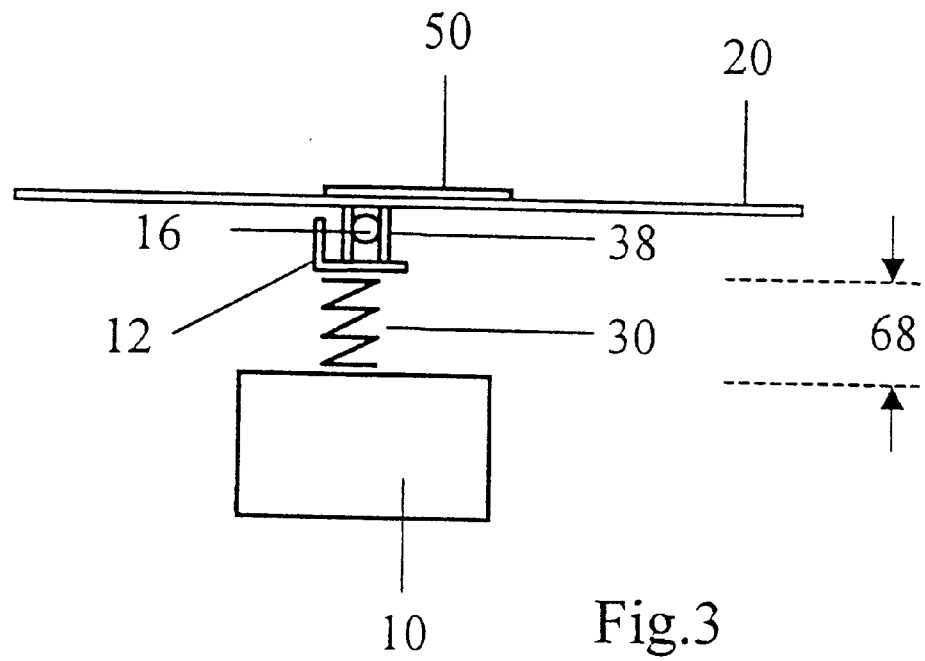
FIG. 3 shows the side view of a first embodiment of the present invention.

FIG. 3 shows the side view of the first embodiment of the present invention. The light source 16 is held by the brackets 38, which are mounted on an L-shaped base 12. The upper tip of the vertical flange of the L-shaped base is lower than the upper tips of the brackets 38. The L-shaped base is coupled to the optical module 10 through a spring 30, which pushes the tips of the brackets 38 against the bottom of the scan window 20, over which a document 50 to be scanned is placed. The bottom of the base 12 and the top of the lens module 10 is separated by a distance 68. Due to intimate contact between the brackets 38 and the scan window 20, the distance between the light source 16 and the document 50 is made much shorter than the prior art shown in FIG. 1. Without allowing for manufacturing tolerance, the light source 16 irradiates the document with much higher intensity than the prior art.

Figure 4:
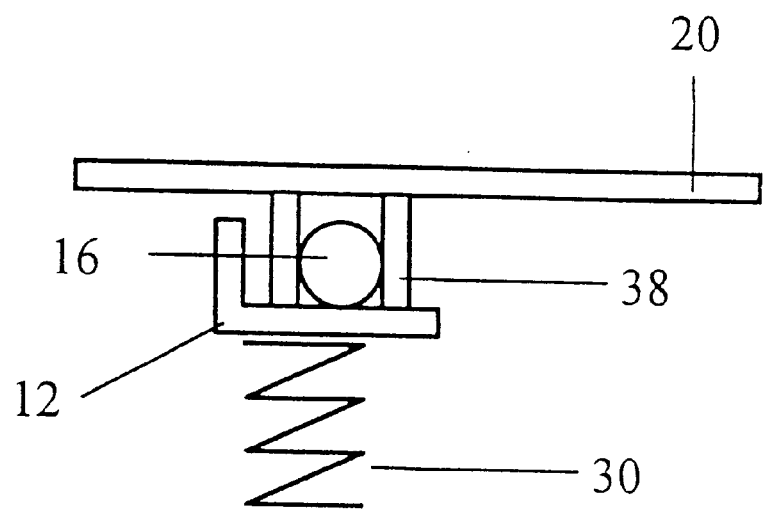
FIG. 4 shows an enlarged view of FIG. 3.

FIG. 4 shows an enlarged view of the L-shaped base 12 and the spring 30. To provide smooth gliding motion of the light source module under the scan window 20, the brackets 38 can be made of low friction material such as nylon.

Figure 5:
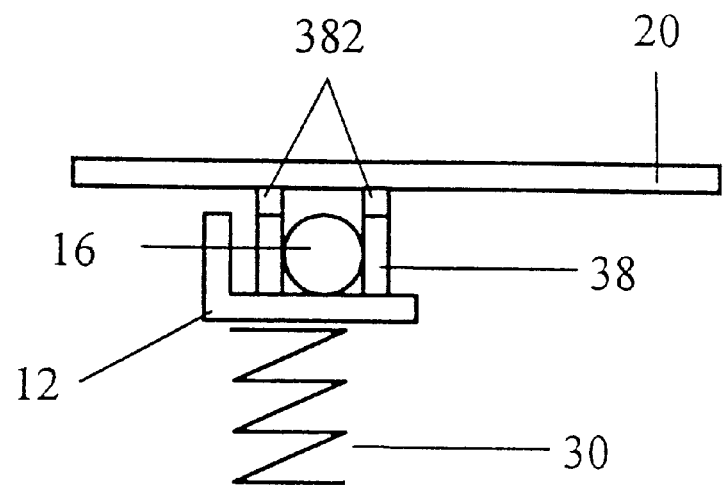
FIG. 5 shows the side view of a second embodiment of the present invention.

FIG. 5 shows a second embodiment of the present invention. The structure is similar to FIG. 4 with same reference numbers referring to the same corresponding parts. The exception is that only the top 382 of the brackets 38 is composed of low friction material. The lower section of the brackets 38 need not be of low friction material.

Figure 6:
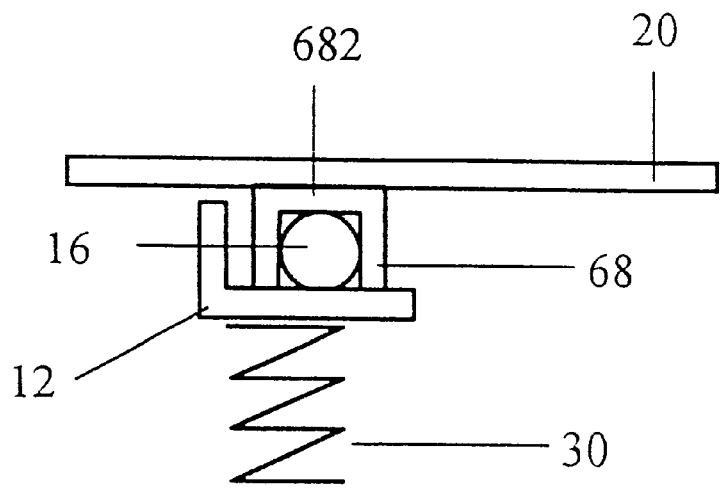
FIG. 6 shows the side view of a third embodiment of the present invention.

FIG. 6 shows a third embodiment of the present invention. The brackets 68 for holding the light source 16 are of inverted U-shape. The tops 682 of the brackets 68 are in contact with the bottom of the scan window 20. The brackets 68 are made of low friction material to allow smooth gliding motion of the light source 16 under the scan window 20. The light source 16 is held by the brackets 68 and mounted on the L-shaped base 12, which is pushed by a spring 30 as described before.

Figure 7:
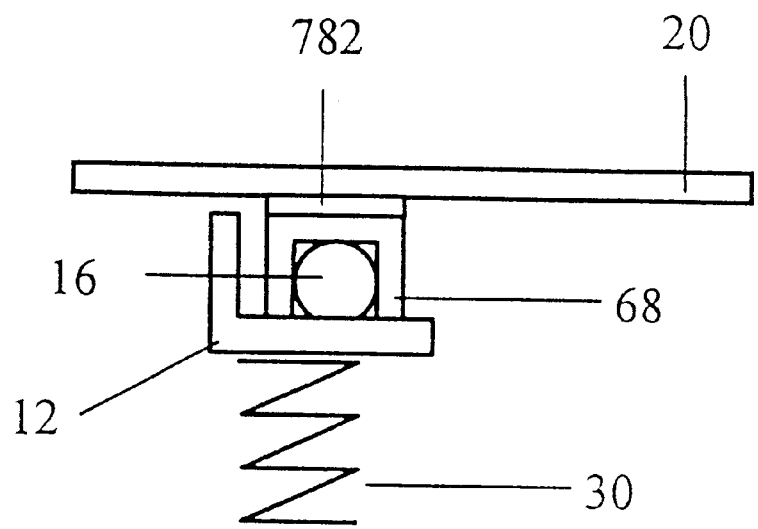
FIG. 7 shows the side view of a fourth embodiment of the present invention.

FIG. 7 shows a fourth embodiment of the present invention. The structure is similar to FIG. 6 with same reference numerals referring to the same corresponding parts. The exception is that the inverted U-shaped brackets 68 is capped with a low friction layer 782, and the body of the brackets 68 itself need not of low friction material. The low friction cap allows smooth gliding motion of the light source under the scan window 20.

Figure 2:
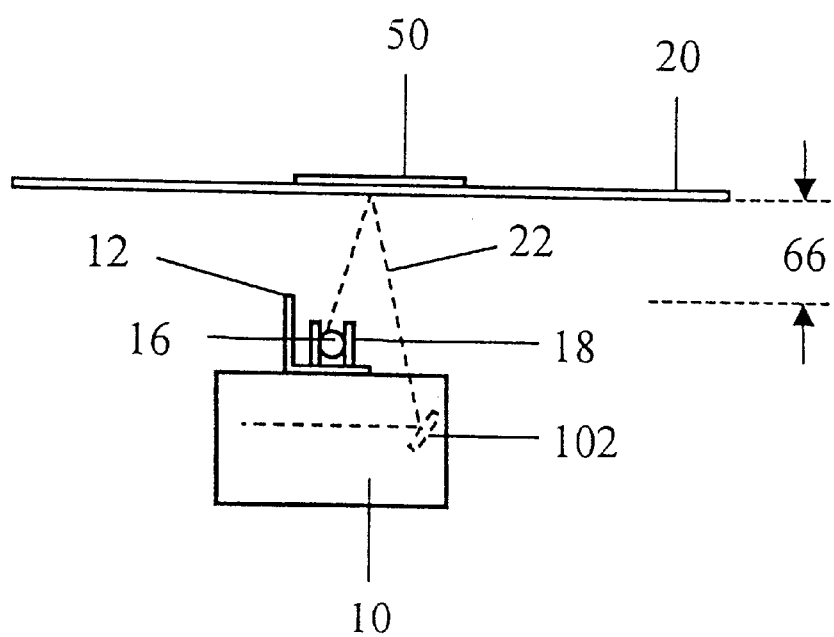
FIG. 2 shows side view of FIG. 1.
Figure 8:
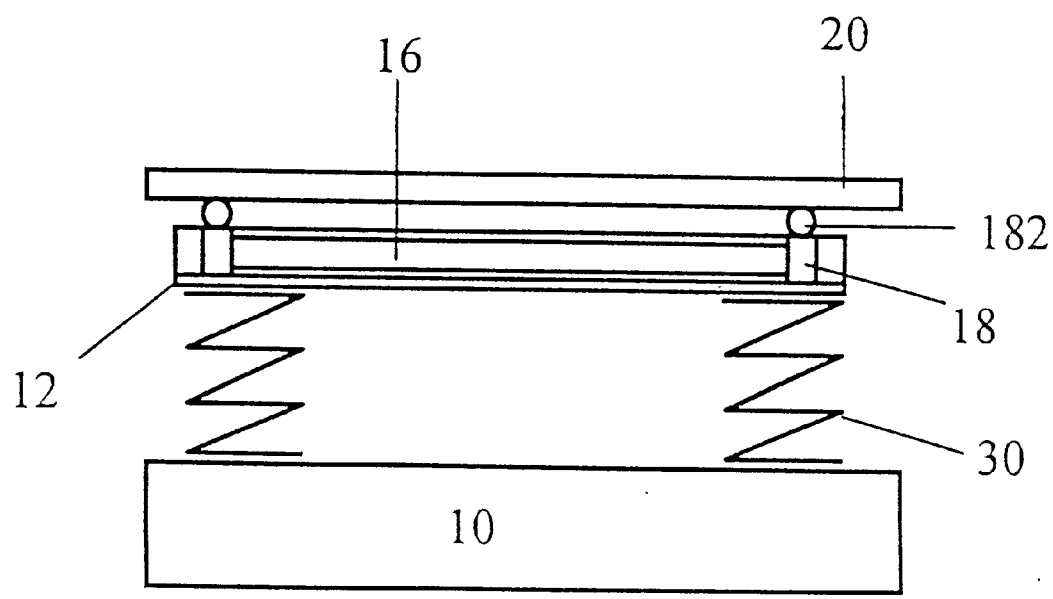
FIG. 8 shows the side view of a fifth embodiment of the present invention.

FIG. 8 shows a fifth embodiment of the present invention. Two tracks 182 of low friction material are attached under the scan window 20. These tracks are aligned with the brackets 18 for holding the light source 16. The brackets 18 are similar to those described in FIG. 2 and mounted on an L-shaped base 12, which is pushed by springs 30 against the lens module 10. The low friction tracks allows smooth scanning motion of the light source 16, while maintaining a short distance between the light source and the scan window 20.

Figure 9:
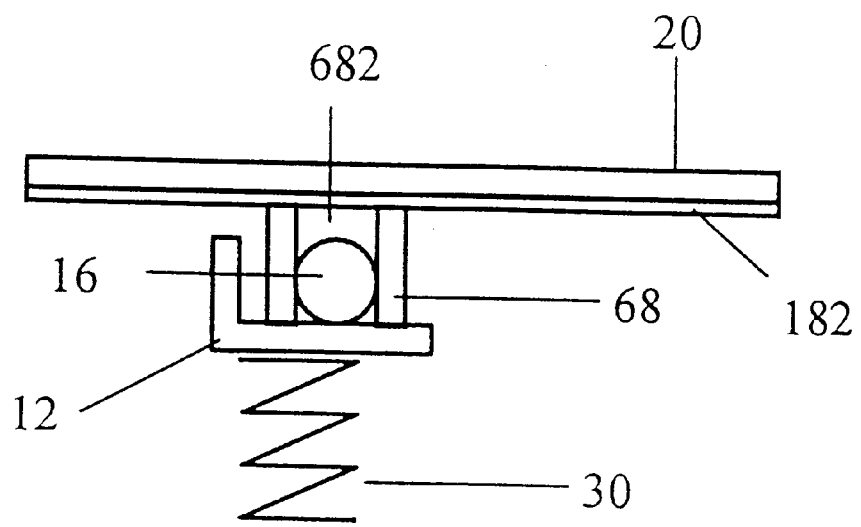
FIG. 9 shows the end view of FIG. 8.

FIG. 9 shows the side view of FIG. 8. Note the long strip 182 attached under the scan window 20.

Figure 10:
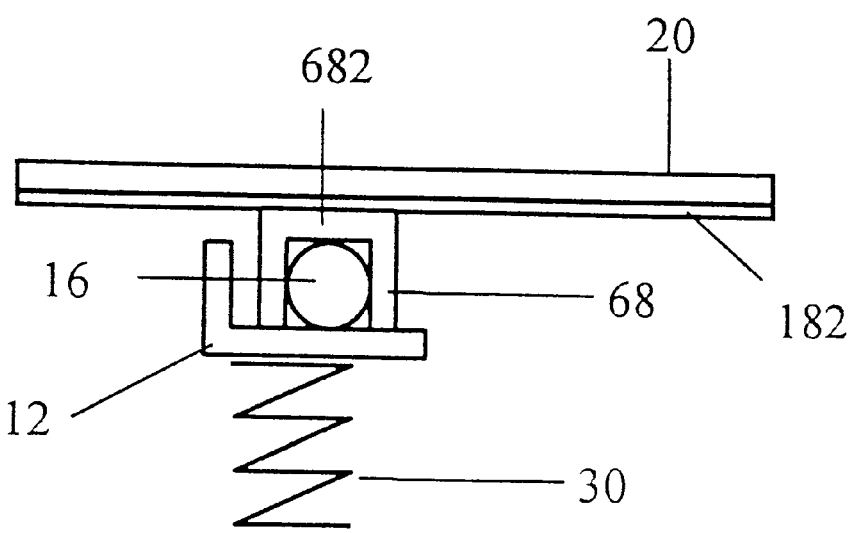
FIG. 10 shows the side view of a sixth embodiment of the present invention.

FIG. 10 shows a sixth embodiment of the present invention. This structure combines the features of FIG. 8 and FIG. 6. The brackets 68 have an inverted U-shape and glide under two long tracks 182 under the scan window 20. Here the brackets 68 need not be of low friction material since the tracks 182 provide the smoothing scan of the light source 16. The slight source module base 12 on which the brackets 68 are mounted is pushed by the spring to glide smoothly under the scan window 20.

Figure 11:
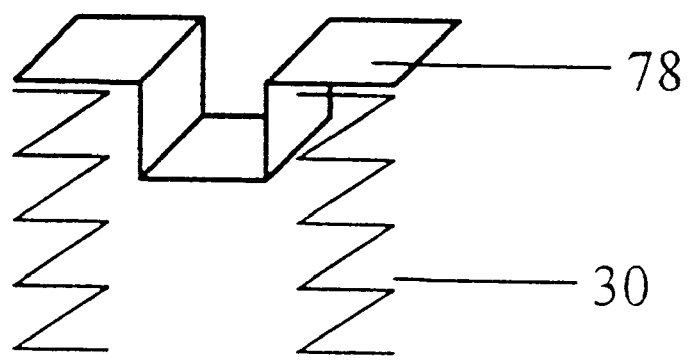
FIG. 11 shows a first design of the sliding guide for the light source.

FIG. 11 shows a design of the brackets 78 for holding the light source. The brackets are of U-shape each with two flanges. Each flange is pushed upward by a spring 30.

Figure 12:
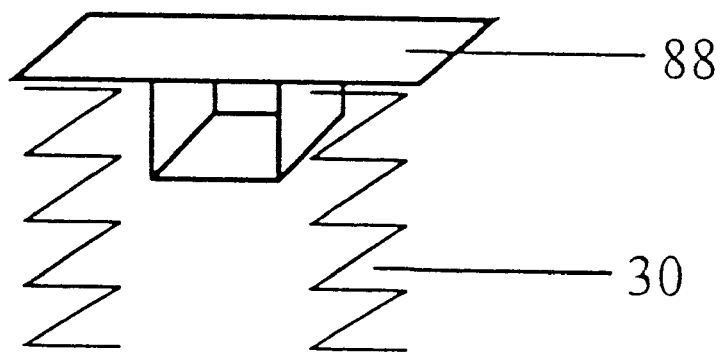
FIG. 12 shows a second design of the sliding guide for the light source.

FIG. 12 shows a second design of the brackets 88 for holding the light source. The brackets are of U-shape with a cover 88 wider than the U-shaped groove forming two flanges. The two flanges are pushed upward by two springs 30.

Figure 13:
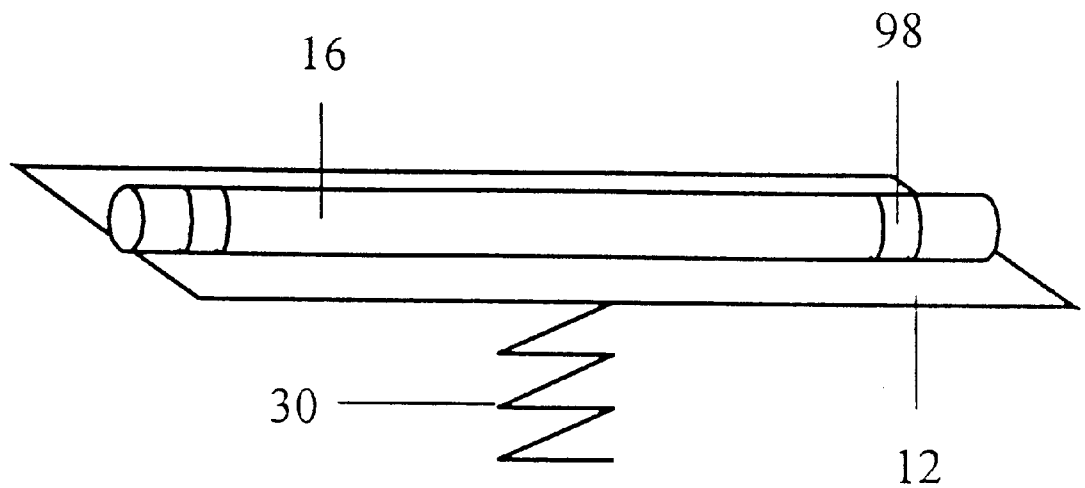
FIG. 13 shows a third design of the sliding guide for the light source.

FIG. 13 shows a third design of the brackets 98. The brackets 98 are coated directly on the light source 16 and attached to the base 12 of the light source module, which is pushed upward by a spring 30. The coating may be applied by painting, electrolysis or wrapping.

Figure 14:
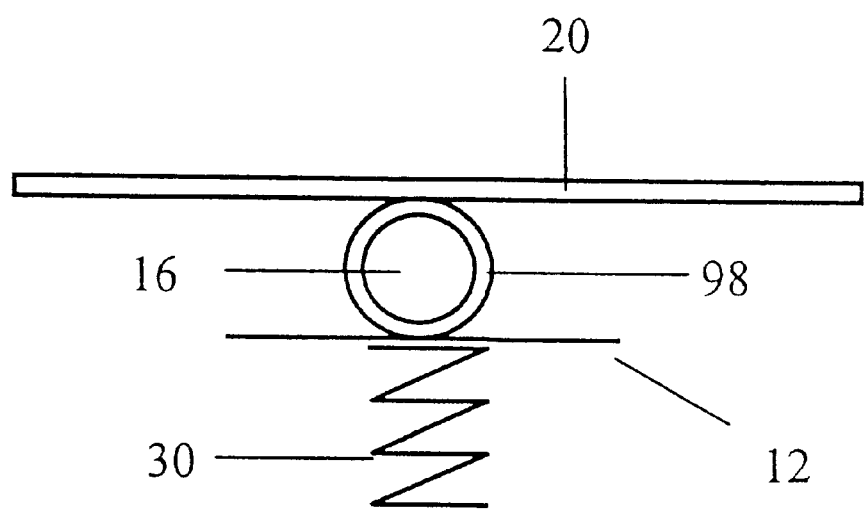
FIG. 14 shows the end view of FIG. 13.

FIG. 14 shows the end view of FIG. 13. The distance between the light source 16 and the window 20 is the thickness of the coating 98.

In prior art, a typical window 20 has a thickness of 3 mm. A typical allowance 66 between the top of light source module and the scan window 20 is 3 mm. In this present invention, the distance between the top of the light source module and the scan window 20 is less than 0.2 mm. The light intensity is inversely proportional to the square of the distance between the light source and the object. In the former case, the intensity is proportional to $1/(3+3)^2=1/36$, while in the latter case the light intensity is proportional to $1/(3+0.2)^2=1/10.24$ The light intensity for the present invention is therefore $(1/10.24)/(1/36)=3.52$ times stronger than prior art. Thus, the present intensity ally utilizes the light source. Due to increased intensity the exposure time can be reduced and the scan speed can be increased. Besides, due the intimate contact between the light source module and scan window, the structure can tolerate a large variation in the dimensions of the different components in the light source module. The low friction contact material allows smooth scanning mother of the light source module.

While a spiral spring 30 is shown in the foregoing figures, other kinds of springs such as elastic belts may also be used, so long as they can exert a push-up action from the lens module to the light source module.

While particular embodiments of the invention have been described, it will be apparent to those skilled in the art that various modifications may be made without departing from the spirit of the present invention. Such modifications are all within the scope of this invention.

What is claimed is:

1. An optical module for a scanner having a scan window on which a document to be scanned is placed, comprising:

a lens module comprising reflecting mirrors and focusing lens;

an light source module above said lens module comprising:

a light source, a pair of brackets for holding said light source, a base for mounting said brackets; and elastic means for pushing said light source module against said scan window such that the distance between said light source and said scan window is minimized.

2. An optical module as described in claim 1, wherein said elastic means comprises at least a spring.

3. An optical module as described in claim 2, wherein said spring is a spiral spring.

4. An optical module as described in claim 1, wherein said base is L-shaped with a vertical flange.

5. An optical module as described in claim 1, where said brackets are two vertical walls sandwiching said light source.

6. An optical module as described in claim 5, wherein said brackets are made of low friction material.

7. An optical module as described in claim 5, wherein said walls are capped with low friction material.

8. An optical module as described in claim 1, wherein said brackets have an inverted U-shape, straddling said light source.

9. An optical module as described in claim 8, wherein said brackets are capped with low friction material.

10. An optical module as described in claim 1, further comprising two tracks of low friction material attached to the bottom of said scan window for said brackets to glide on.

11. An optical module as described in claim 10, wherein said brackets each comprises two walls sandwiching said light source.

12. An optical module as described in claim 10, wherein said brackets are of inverted U-shape, straddling said light source.

13. An optical module as described in claim 1, wherein said brackets are of U-shape with two side horizontal flanges which are pushed upward by two springs from the lens module.

14. An optical module as described in claim 1, wherein said brackets are of U-shaped and capped by a cover with two overhanging wings which are pushed upward by two springs.

15. An optical module as described in claim 1, wherein said brackets wraps around said light source.

16. An optical module as described in claim 15, wherein said brackets are formed by a process selected from the group consisting of painting, electrolysis and wrapping.

* * * * *